United States Patent [19]

Keith

[11] Patent Number: 4,713,939
[45] Date of Patent: Dec. 22, 1987

[54] LINEAR DRIVE MOTOR WITH SYMMETRIC MAGNETIC FIELDS FOR A COOLING SYSTEM

[75] Inventor: William C. Keith, Garland, Tex.

[73] Assignee: Texas Instruments Incorporated, Dallas, Tex.

[21] Appl. No.: 867,850

[22] Filed: May 23, 1986

[51] Int. Cl.$^4$ .......................... F25B 9/00; H01L 25/00
[52] U.S. Cl. ............................................ 62/6; 60/520; 310/12; 310/15; 250/332
[58] Field of Search ............... 62/6; 60/520, 517, 518, 60/519; 250/332; 310/12, 13, 15, 16, 17

[56] References Cited

U.S. PATENT DOCUMENTS 3,781,559 12/1973 Cooper et al. .
3,851,173 11/1974 Taylor et al. .
4,534,176 8/1985 Horn et al. .
4,545,209 11/1985 Young .
4,610,143 9/1986 Stolfi et al. .............................. 62/6

Primary Examiner—Henry A. Bennett
Attorney, Agent, or Firm—Richard K. Robinson; James T. Comfort; Melvin Sharp

[57] ABSTRACT

A cooling system has a compressor for producing cyclic pressure conditions within a refrigerator's system's volume. The compressor alternately increases and decreases the working volume, thus raising and lowering the coolant pressure. An expander reacts to this cyclic pressure change in such a manner to achieve a net removal of work, or, in the other words, provide cooling at the cold tip.

6 Claims, 6 Drawing Figures

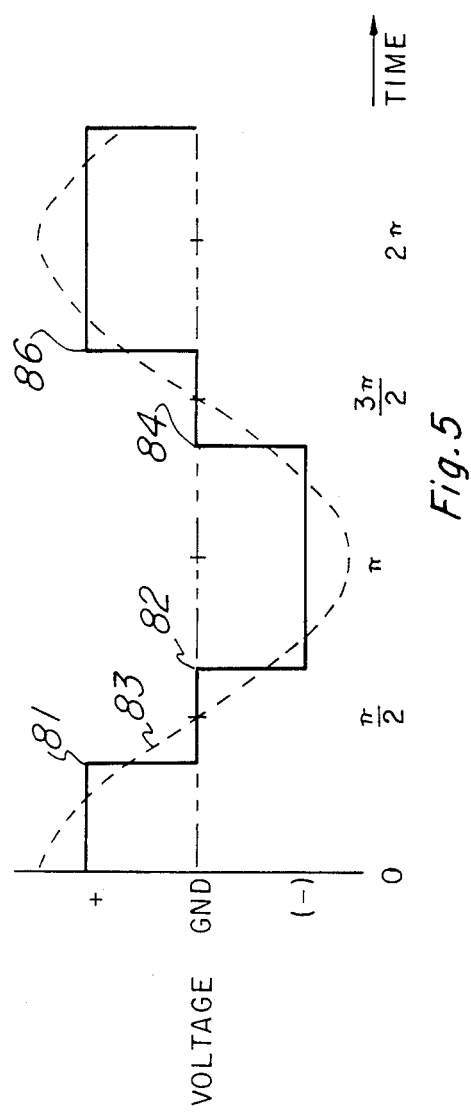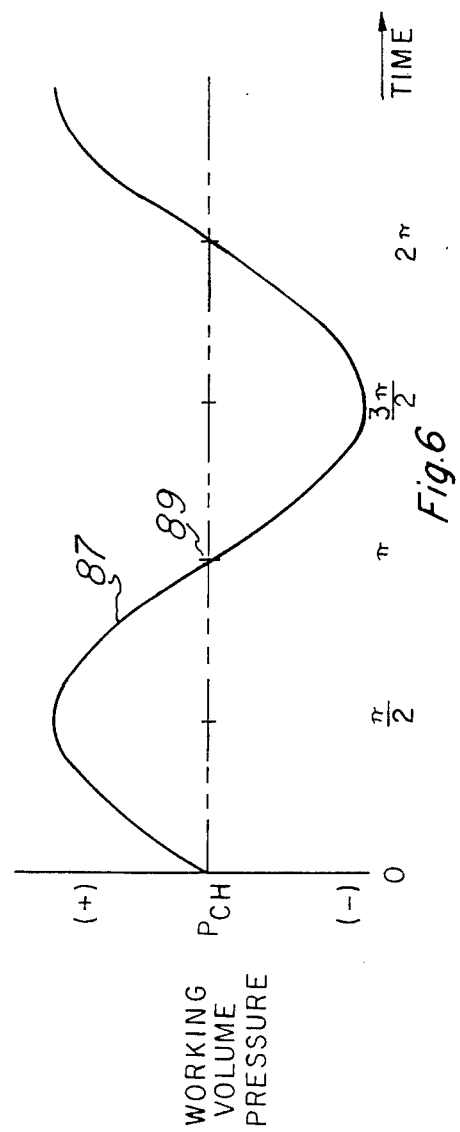

LINEAR DRIVE MOTOR WITH SYMMETRIC MAGNETIC FIELDS FOR A COOLING SYSTEM

BACKGROUND OF THE INVENTION

This invention relates to a cooling system for an infrared detector, and in particular, the cooling system that uses a linear motor to operate a compressor.

Infrared (I/R) detectors are used for detection of infrared energy and it is usually necessary to maintain the detector at a cryogenic temperature. An example of a prior art cooling system is disclosed in U.S. Pat. No. 3,851,173 entitled "A Thermal Energy Receiver". In the case where the infrared detector is part of a night sight, the integration of linear resonant coolers into the infrared night sight has encountered several problems. A large external magnetic field is generally emitted by the compressor motor which causes EMI problems in the infrared system. The slightest relative motion between the magnetic field and the conductors within the field induces electrical noise on the video circuit which is connected to the infrared detectors causing a degradation in the video output.

Another problem is the vibration caused by the compressor at its resonant frequency. In infrared systems, precision optics are used that are sensitive to vibrations. This, of course, also causes also causes degradation in the video output.

Several schemes have been employed to minimize the effect of EMI interferences or noise from the linear compressor. Heavy shielding of the compressor to intercept the external magnetic field, extensive shielding of the video circuit, and placing the compressor more remotely from the electronics have been tried. Each of these solutions have undesirable consequences.

One solution for reducing vibration has been to include a spring mass type harmonic balancer within the compressor. However, with a balancer any variation in the frequency of operation results in a decrease in the balancer efficiency. Also, external sources of vibration can excite undamped oscillations.

An alternate method of a compressor balancing has been suggested in a NASA patent application Ser. No. N85-21404 in which a pair of mutually opposed pistons moving in unison produces a compression wave without transmitting reaction forces to the compressor or structure. This method achieves satisfactory balancing, however, the required technology development for the device as described has not been demonstrated.

SUMMARY OF THE INVENTION

A cooling system has a compressor for producing cyclic pressure conditions within a refrigerator's system's volume. The compressor alternately increases and decreases the working volume thus raising and lowering the coolant pressure. An expander reacts to this cyclic pressure change in such a manner to achieve a net removal of work, or, in other words, provide cooling at the cold tip.

It is an object of this invention to provide a cooling system that has a linear motor that operates with a minimum of vibration;

It is another object of the invention to provide a cooling system that has a linear motor that operates with a minimum of magnetic fields external to the compressor.

These and other objects and advantages of the invention will be apparent from reading the specification in conjunction with the figures in which:

BRIEF DESCRIPTION OF THE FIGURES

FIG. 5 is a waveform diagram of the voltages that are used to operate the dual action linear induction motor according to the invention; and FIG. 6 is a waveform diagram illustrating the pressure of the dual armature linear induction motor type compressor according to the invention.

DETAILED DESCRIPTION OF THE EMBODIMENTS

Figure 1:
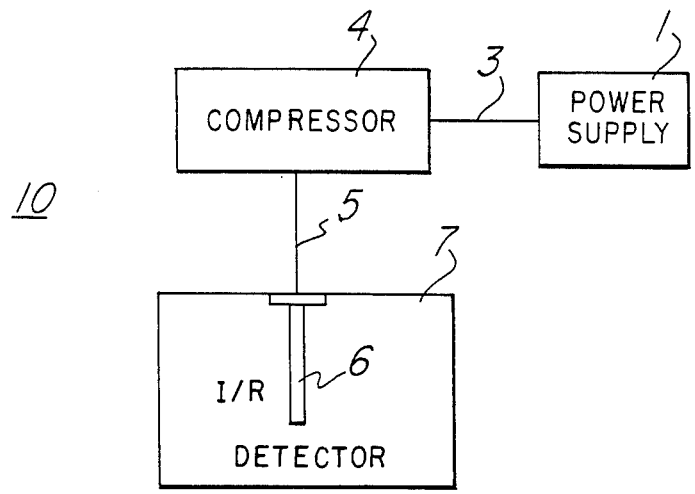
FIG. 1 is a block diagram of the cooling system according to the invention.

FIG. 1 is a block diagram of a cooling system 10 incorporating a dual armature compressor 4. The dual armature compressor 4 is powered by a power supply 1 which is connected to the dual armature compressor 4 via conductors 3. The dual armature compressor 4 compresses a coolant such as helium and applies it via a conduit 5 to an expander 6 shaped like a cold finger that it thermally connected to an infrared detector 7. The expander 6, through the expansion of the compressed gas from the compressor 4, cools the IR detector 7. The cooling system described operates on what is referred to in the art as the Stirling cycle.

Figure 2:
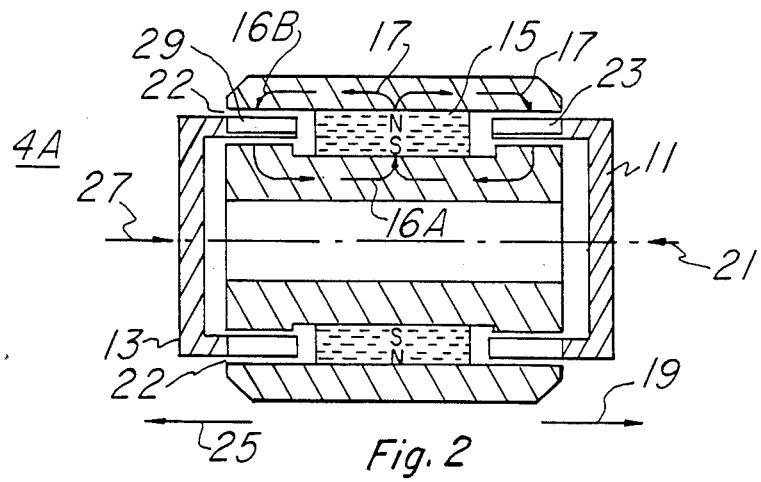
FIG. 2 is a sectional diagram of the dual armature linear motor according to the invention.

The compressor 4 has a balanced linear motor design which is illustrated in a section view in FIG. 2. The balanced linear motor has a generally cylindrical shape with a permanent magnet 15, an inner and outer iron focusing field 16A and 16B, And two identical coils end assemblies 11 and 13 with each end assembly including a coil winding. The permanent magnet 15 produces lines of magnetic flux 17 which follow two independent, but symmetrical magnetic flux paths through the iron focusing fields 16A and 16B, and across identical air gaps 22 at each end. Close symmetry of the magnetic flux field in each air gap 22 is assured by the mirror image geometry of the focusing fields 16A and 16B. Two identical coil windings, 23 and 29, operate in the air gaps 22 and are driven by a common electrical input wave form. The coil windings 23 and 29 may be electrically connected in parallel or in series with attention to polarity. When voltage is applied to the coil windings 23 and 29, the current flows to generate an induced magnetic force in opposition to the force produced by magnetic flux 17 in the air gaps. The magnetic force sets the movable coils 11 and 13 in linear motion in the direction of arrows 21 and 27. Reversing the current direction through the coil windings 23 and 29 reverses the magnetic force and the direction of motion 19 and 25 of the coils 11 and 13. Complete symmetry of the magnet 15, focusing fields 16A and 16B, air gaps, coil windings 23 and 29, and the applied current, result in a balanced, opposed motion of the two end assemblies 11 and 13. Also, since the permanent magnet 15 is fully enclosed by the focusing fields 16A and 16B and the air gaps 22, the entire available flux of the magnet can be focused across the air gaps 22 and the detrimental external magnetic field of the motor is minimized.

Figure 3:
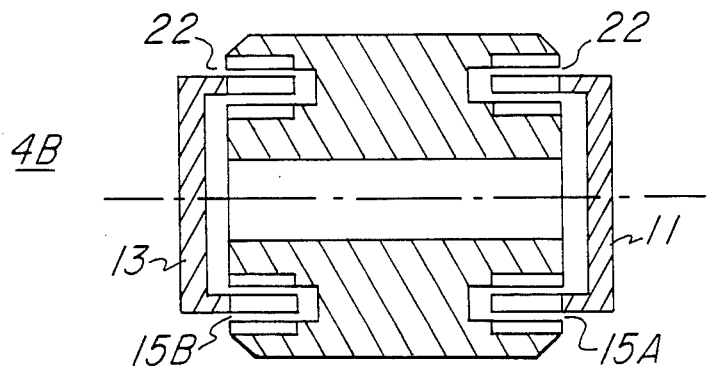
FIG. 3 is an alternate embodiment illustrating a sectional diagram of the linear induction motor according to the invention.

FIG. 3 shows a sectional view of an alternate embodiment of a linear induction motor 4B in which cylindrical shaped end assemblies 11 and 13 have a permanent magnet, identical permanent magnets 15A or 15B, attach to it and extend into the air gaps 22. The identical windings 23 and 29 are also mounted in the air gaps 22 and are wound to produce magnetic fields that, as in the case of FIG. 2, will either attract or repel the magnet of the permanent magnet 15A and 15B.

Figure 4:
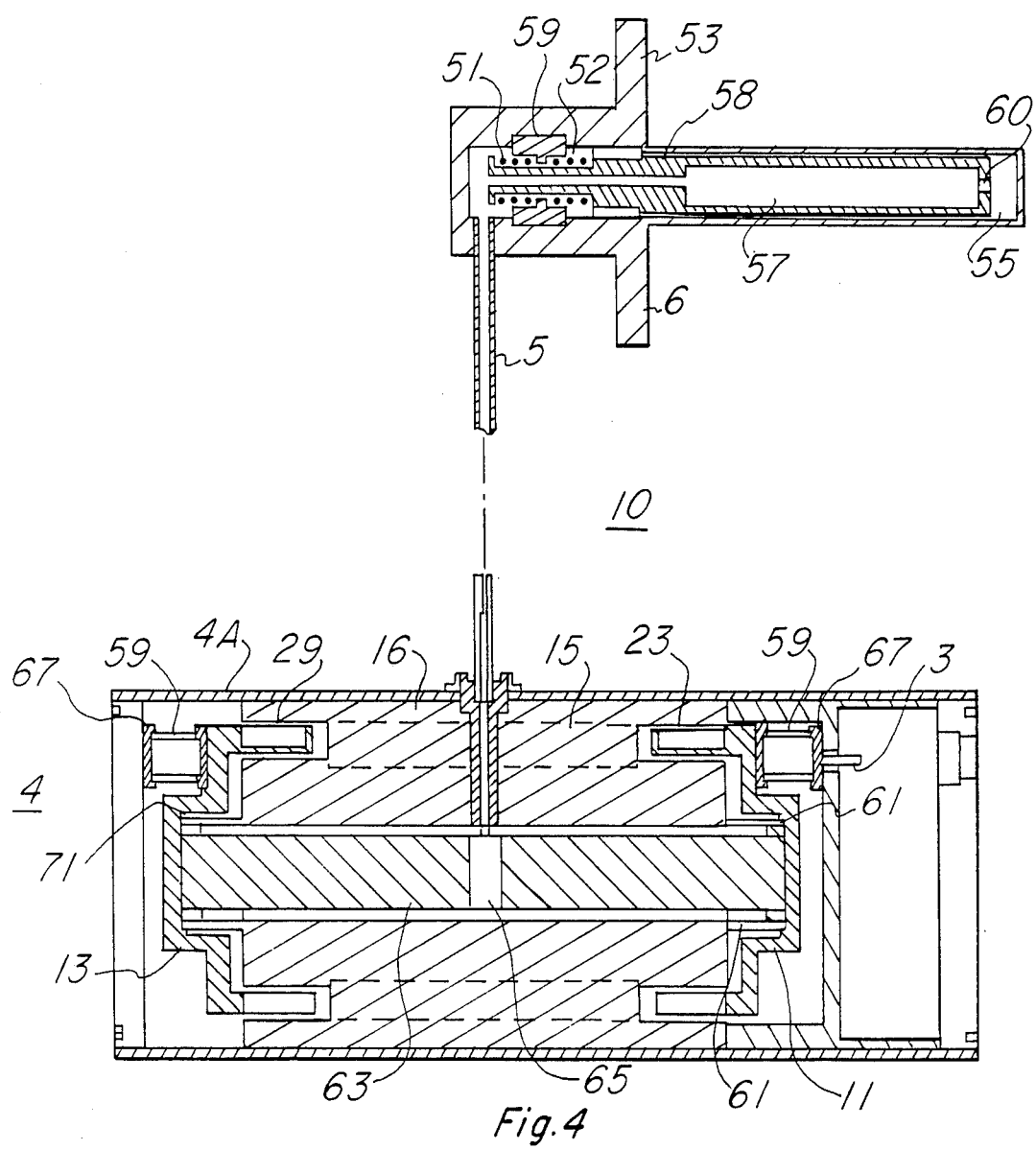
FIG. 4 is a sectional block diagram of the cooling system of FIG. 1.

FIG. 4 is a sectional view of a closed loop cooling system 10 that utilizes the linear induction 4A drive motor with symmetric magnetic fields to drive the compressor 4. The end assemblies 11 and 13 are attached to identical pistons 63. A compression space 65 is formed between the two opposed pistons 63 and the space is ported through a transfer tube 5 to an expander 6. Each piston 63 is biased toward midstroke position by a set of mechanical springs 61 and 59. Springs 59 each represents a set of three springs equally spaced around the diameter of the end assemblies 11 and 13 which make continuous electrical contact between the identical windings 23 and 29 and the stationary electrical contacts 67. By applying an A/C type voltage (FIG. 5) to the electrical contacts 67 which cyclically reverses the current direction through the identical windings 23, 29 alternating push-pull magnetic forces are applied to the end assemblies 11, and 13, causing the pistons 63 to oscillate with opposed, balanced motion. When the operating compressor 4 is pressurized with a gas, such as helium, the opposing motion of the pistons create a sinusoidal fluctuation of the compression space 65 and the working volume pressure (FIG. 6). The end assemblies 11 and 13 consequently the pistons vibrate as a forced spring mass system; therefore, minimum electrical power is required when the frequency of the A/C power input matches the mechanical resonance of the assemblies. Complete symmetry of the motor 4A, pistons 63, and spring mechanisms 59 and 61 result in equal, opposed vibration of the two end assemblies 11 and 13, thereby mutually cancelling the vibration transmitted to the compressor housing. The result is a smooth, balanced operation of the compressor 4 at any operating frequency.

FIG. 5 shows a waveform 83 of the voltage that is applied to the compressor 4 from the power supply 1 when D/C power is used. It is essentially a square wave step function operating in a 360 degree cycle. It starts at a +1 and at approximately 60 degrees, point 81, drops to the zero level and then at 120 degrees, point 82, drops to a $-1$ level where it stays until 210 degrees, point 84 then it goes back to zero and at 300 degrees, point 86 the waveform returns to the positive 1 position. This is approximately equivalent to the sinusoidal waveform that as indicated by waveform 83.

In FIG. 6, the working volume pressure that is present in the compression space 65 is represented by waveform 87. At resonant it is a sinusoidal waveform that is essentially 90 degrees out of phase with waveform 83 of FIG. 5.

Returning to FIG. 4, the expander 6 includes a mounting flange 53 for mounting of expander to the IR detector 7. The compressed coolant, such as helium, is applied via the helium transfer tube 5 to the expander 6 where it enters a movable displacer 58 having a matrix reservoir 57.

There are a variety of methods currently employed to produce cooling by the expander. For instance, refer to Horn (U.S. Pat. No. 3,765,187), Chellis et al (U.S. Pat. No. 4,543,793). Lam (U.S. Pat. No. 4,385,499). All of these techniques may be used with the linear drive compressor described in this invention; however, the expander used in the embodiment shown includes compression springs 51 and 52 and spring guide 59 for guiding the movable displacer 58. The goal is to properly phase the motion of the displacer 58 with the working volume pressure waveform 87. Notice that the reciprocating motion of displacer 58 modulates the cold volume 55. It is well known that the cooling produced in expansion volume 55 is given by:

$$\dot{Q} = \oint P dV_{55}$$

Matrix Reservoir 57 serves as an energy storage and heat exchange device. It has an appropriate linear temperature gradient - the end in contact with expansion volume 55 is approximately at the machine's cryogenic temperature; the opposite end is approximately at the external ambient temperature. During portions of the cycle in which pressure is increasing there is a net flow of working fluid toward cold volume 55. The matrix reservoir absorbs energy from the working fluid thus precooling the fluid as it flows toward cold volume 55. As the pressure declines, the mirror image process occurs. There is a net flow of fluid toward the ambient end of the matrix reservoir. Heat exchange between the fluid and matrix extracts energy from the matrix (warming the fluid). The energy extracted during this depressurization phase is similar in magnitude to that absorbed during pressurization. The design and material selection of the matrix reservoir is well documented in the scientific literature (see, for instance, Andeen U.S. Pat. No. 4,404,808).

The above described invention is now claimed by the appended claims.

What is claimed is:

1. A cooling system comprising:
   a combination of a compressor and dual armature linear induction motor including a stator having a generally cylindrical shape, a first end and a second end and a first magnetic means centrally located between the first end and second end within the body of the stator, the magnetic means provides a first and second magnetic fields;
   a first armature shaped to operatively fit on the first end of the stator and including a second magnetic means for providing a third magnetic field;
   a second armature shaped to fit on the second end of the stator and having a third magnetic means for providing a fourth magnetic field;
   a conduit through the center of the stator and extending outward for conducting a coolant between the combination of a compressor and dual armature linear induction motor and an expander;
   a first piston connected to the first armature and extending into the stator;
   a second piston connected to the second armature and also extending into the stator;
   the first and second pistons operatively mounted in the stator to compress and expand a predefined volume located at conduit at the center of the stator;
   the expander being operatively connected to the conduit for receipt of the coolant; and a power supply for providing current to the combination of a compressor and dual armature linear induction motor to cause the first and second pistons to alternately compress and expand the predefined volume in response to the provided current.

2. The cooling system according to claim 1 wherein the first magnetic means includes a magnetic having a north pole for producing the first magnetic field and a south pole for producing the second magnetic field;

the second magnetic means includes a first winding for providing the third magnetic field which has changeable poles as determined by the direction of the current flow through the first winding; and the third magnetic means includes a second winding for providing the fourth magnetic field which has changeable poles as determined by the direction of the current flow through the second winding.

3. The cooling system according to claim 1 wherein the first magnetic means includes, a first winding for producing the first magnetic field having changeable poles as determined by the direction of the current flow through the first winding and a second winding for producing the second magnetic field having changeable poles as determined by the direction of the current flow through the second winding;

the second magnetic means includes a first magnetic for producing the third magnetic field; and the third magnetic means includes a second magnetic for producing the second magnetic field.

4. A dual armature linear induction motor comprising:

a stator having a generally cylindrical shape, a first end and a second end and a first magnetic means centrally located between the first end and second end within the body of the stator, the magnetic means provides a first and second magnetic fields;

a first armature shaped to operativel fit on the first end of the stator and including a second magnetic means for providing a third magnetic field;

a second armature shaped to fit on the second end of the stator and having a third magnetic means for providing a fourth magnetic field;

a first piston connected to the first armature and extending into the stator;

a second piston connected to the second armature and also extending into the stator; and the first and second pistons operatively mounted in the stator to compress and expand a predefined volume located at the center of the stator.

5. The dual armature linear induction motor according to claim 4 wherein the first magnetic means includes a magnetic having a north pole for producing the first magnetic field and a south pole for producing the second magnetic field;

the second magnetic means includes a first winding for providing the third magnetic field which has changeable poles as determined by the direction of the current flow through the first winding; and the third magnetic means includes a second winding for providing the fourth magnetic field which has changeable poles as determined by the direction of the current flow through the second winding.

6. The dual armature linear induction motor according to claim 4 wherein the first magnetic means includes, a first winding for producing the first magnetic field having changeable poles as determined by the direction of the current flow through the first winding and a second winding for producing the second magnetic field having changeable poles as determined by the direction of the current flow through the second winding;

the second magnetic means includes a first magnetic for producing the third magnetic field; and the third magnetic means includes a second magnetic for producing the second magnetic field.

* * * * *